United States Patent [19]

Kilen et al.

[11] Patent Number: 4,564,794

[45] Date of Patent: Jan. 14, 1986

[54] PHASE LOCKED LOOP AND A MOTOR CONTROL SERVO

[75] Inventors: Richard S. Kilen, Longmont; Larry E. Rittenhouse, Boulder, both of Colo.

[73] Assignee: International Business Machines Corporation, Armonk, N.Y.

[21] Appl. No.: 737,003

[22] Filed: May 23, 1985

[51] Int. Cl.$^4$ .......................... H02P 5/16; G05B 5/00
[52] U.S. Cl. .................................... 318/314; 318/327; 318/341; 318/608; 318/600
[58] Field of Search ............... 318/314, 326, 327, 341, 318/317, 318, 599, 600, 601, 603, 604, 606, 607, 608, 628, 616, 617, 618, 632, 633; 329/104, 110, 122; 307/511, 514

[56] References Cited

U.S. PATENT DOCUMENTS

| | | | |
|---|---|---|---|
| 3,936,762 | 2/1976 | Cox, Jr. et al. | 329/104 |
| 4,027,215 | 5/1977 | Knight et al. | 318/341 |
| 4,243,921 | 1/1981 | Tamura et al. | 318/314 |
| 4,254,367 | 3/1981 | Sakamoto | 318/608 X |
| 4,287,461 | 9/1981 | Promis et al. | 318/603 X |
| 4,492,903 | 1/1985 | Knight et al. | 318/341 |
| 4,500,822 | 2/1985 | Tajima et al. | 318/314 |
| 4,504,960 | 3/1985 | Yamada | 329/104 X |

OTHER PUBLICATIONS

IBM Technical Disclosure Bulletin, vol. 23, No. 11, Apr. 1981, "Digital Phase Error Detector", by L. Taber, pp. 5171–5173.

Primary Examiner—William M. Shoop, Jr.
Assistant Examiner—Shik Luen Paul Ip
Attorney, Agent, or Firm—Francis A. Sirr

[57] ABSTRACT

The speed of a DC motor (10) is controlled by a servo which includes a digital phase lock loop. The motor drives a tachometer whose pulse (22) frequency is low relative to the frequency of a clock (21). The clock continuously drives a counter (200) whose ever increasing number content is gated to a data latch (26) upon the occurrence of each successive tachometer pulse, thus this data latch contains a first time-number of ever increasing magnitude. A second data latch (24) contains a second number. The difference in magnitude of two consecutive time-numbers is indicative of motor speed. Initially, this second number is set to contain a reference number (REF) which is equal in magnitude to the number of clock pulses which will occur between adjacent tachometer pulses when the motor is running at desired speed. A pair of limit numbers (RANGEL and RANGEH) are provided to define the upper and lower limits of servo saturation. The difference between the first number and the second number is detected upon the occurrence of each tachometer pulse to generate a third or difference number (ERRA). This difference number is compared to the two limit numbers to determine if the servo is in saturation. If it is not in saturation, the second number is reset to a value which is equal to the old value plus the reference number. If the servo is in saturation, the second number is reset to a number which is a function of the first number, the reference number, and that limit number which is associated with the particular mode of saturation.

13 Claims, 4 Drawing Figures

PHASE LOCKED LOOP AND A MOTOR CONTROL SERVO

DESCRIPTION

1. Field of the invention

This invention relates to phase locked loops, to servo control of motor speed by the use of a phase locked loop, and particularly to a closed loop servomechanism which includes a phase locked loop.

2. Background of the Invention

Phase locked loops are well known in the art. In such a loop network or circuit, the phase of a reference alternating signal, as provided by a reference clock, is compared to the phase of an alternating input signal of usually variable phase. Detection of a phase difference between these two signals originates an output error signal.

In the use of such a loop to control the speed of a motor, the frequency of the reference clock constitutes the command speed at which the motor should run, and the actual speed of the motor is represented by a feedback signal in the form of the aforesaid input signal. The aforesaid error signal is used to control the magnitude of motor energization, so as to bring the motor to the correct speed, thus reducing the phase error, and the error signal, to substantially zero.

As can be appreciated, the servo may go out of frequency lock, i.e. the frequency of the reference clock and the feedback signal will be very different, and the phase error will be very large or saturated, during acceleration of the motor from rest to a running speed, or when a large motor speed change is requested. In this condition, the motor receives full energization. The magnitude of motor energization is now no longer closely related to the difference between the motor's actual speed and its desired speed. Eventually the circuit will come out of saturation. However, at this time the motor's speed is usually much higher than the desired speed, and although the servo subsequently brings the motor to the correct speed, this is usually accomplished only with speed overshoot and oscillation about the desired speed.

The present invention corrects this problem found in prior art devices.

Exemplary prior art is U.S. Pat. No. 3,936,762 where a digital phase locked loop is provided. In this device, the reference clock signal is derived by dividing a signal which is generated by a fixed frequency clock. The reference clock is compared to an input signal, and a phase error signal is generated. The phase error signal operates to delete pulses normally issued by the fixed clock source, and in this way the frequency of the reference clock signal is changed in response to phase error. This patent does not teach continuously controlling the time of occurrence of the reference clock's pulses, to be synchronized to the input signal frequency, during the time interval that the phase error remains at a maximum magnitude, such as occurs during saturation, followed by controlling the reference clock to be essentially in phase when saturation no longer exists.

The IBM TECHNICAL DISCLOSURE BULLETIN of April 1981, at pages 5171–5173, describes a network wherein the frequency and phase of a reference clock is adjusted as a function of phase error. Here again, the network does not detect the occurrence of saturation, and the modification of the reference clock's operation as a result thereof.

SUMMARY OF THE INVENTION

This invention relates to phase lock loop control systems, and has particular utility in controlling DC motors.

During large speed changes of a DC motor, the phase error signal, which operates to produce changes in the motor's energization, will become very large, causing the system's phase detector to reach saturation. Due to this saturation, the prior art's motor speed is usually too high at the time that the phase detector comes out of saturation. As a result, the motor speed overshoots the desired speed. After a time, the variation in motor speed settles down and locks at the desired speed.

This invention solves this speed overshoot problem by generating a much smaller phase error signal when the phase detector reaches saturation. A level of motor energization is, however, maintained to insure that the motor reaches running speed in a short time interval. This is accomplished in a digital phase lock loop by generating a new reference number (NREF), to limit motor energization, so long as the phase detector remains in saturation. A feedback number (TEDGE) is generated, indicative of motor speed, upon the occurrence of each motor tachometer pulse. As long as the servo is saturated, this actual speed number (TEDGE) has not as yet caught up with the new reference number (NREF), and there remains a large phase error (ERRA) when the next tachometer feedback pulse arrives. As a result, the detected phase error continues to cause the new reference number (NREF) to be adjusted to a value which would produce a phase error number ERRA equal to the constant value of RANGEL or RANGEH, whichever is in effect due to the saturation mode, when the next feedback pulse TACH occurs, under the assumption that the motor is up to speed.

When the phase error number (ERRA) no longer exceeds some maximum value (i.e. the predetermined values RANGEL and RANGEH which have been chosen as an indication of saturation), the new reference number (NREF) is reset to be equal to the old reference number (NREF), plus the predetermined number (REF) whose magnitude is indicative of the command motor speed. The phase lock loop thereafter operates in the normal manner to bring the reference number and feedback number into phase sync.

The numerical value of saturation constants RANGEL and RANGEH are chosen to provide a predefined and desired behavior criteria from phase compensator 13, buffer amplifier 14 and DC motor 10 (FIG. 1). For example, RANGEL and RANGEH could be chosen to avoid saturation in phase compensator 13 when a large step phase error ERR occurs. Alternatively, RANGEL and RANGEH may be chosen to provide maximum output from the phase compensator when the phase error ERR is equal to either RANGEL or RANGEH. Other possible criteria will be evident to those skilled in the art.

This invention is particularly useful in the microprocessor control of motors, and represents a simple digital technique for rapidly phase locking an input and output signal together.

This invention provides a digital phase detector wherein the phase error output is limited in magnitude so long as the phase detector remains in saturation. Once the phase detector is no longer saturated, the phase error becomes proportional to the actual phase error.

A feature of this invention is the use of such a phase detector in a phase lock loop. A further feature is the use of such a phase lock loop for DC motor speed control.

THE INVENTION

Figure 1:
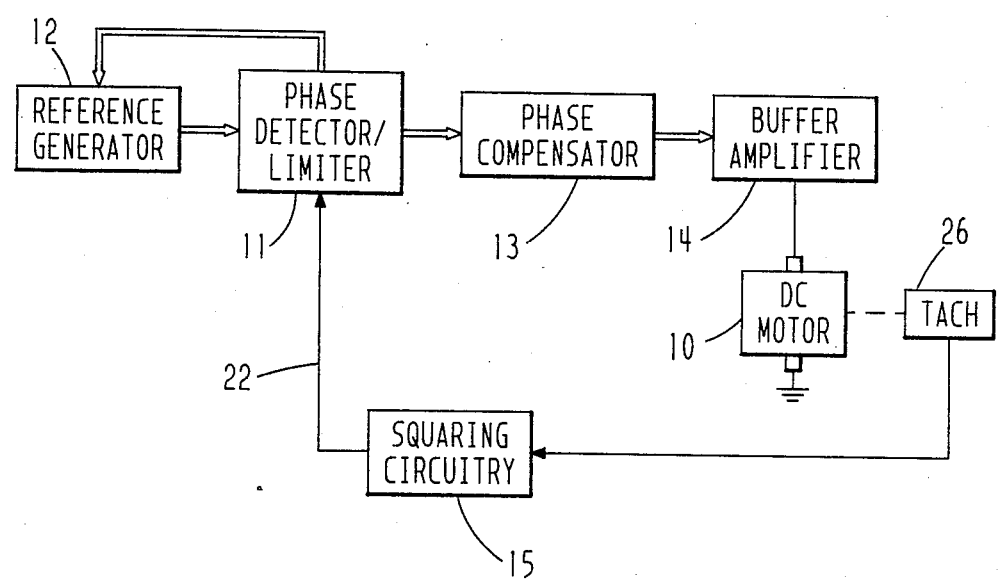
FIG. 1 is a block diagram of the present invention used in a phase locked loop to control the speed of a DC motor.

FIG. 1 is a block diagram showing use of the present invention used to control the speed of DC motor 10.

Motor 10 is connected, for example, to the spindle of a floppy disk drive (not shown). The spindle of such a disk drive spins a floppy disk, and can be driven at a constant speed, or the spindle's speed may change as the drive's magnetic head is moved to different tracks on the disk. For example, it may be desirable to maintain the linear head-to-disk speed constant for all tracks, in which case it is necessary to reduce the rotational speed of the disk as the head moves to the disk's outer tracks. The present invention is useful in controlling acceleration of motor 10 from a rest condition to a full speed condition, and can also be used to achieve motor speed change.

The novel phase lock loop portion of the control system of FIG. 1 can be implemented using a number of different technologies, all of which will be apparent to those of skill in the art. A preferred means to accomplish the present invention is to use a programmable micro computer having an onboard timer. As will also be understood, a custom semiconductor chip can be produced to achieve the present invention, or discrete logic circuits or blocks can be interconnected to achieve the present invention. For the purposes of explaining the present invention, a discrete logic block arrangement will be described in detail. From this description, one of skill in the art will be enabled to program a microcomputer, or provide a custom chip, as desired, in order to reproduce the present invention.

The present invention, in its broadest aspects, resides in phase detector/limiter 11 and reference generator 12.

Portions 11 and 12 are entirely digital. Phase compensator 13, buffer amplifier 14 and squaring circuit 15 are all well known, conventional circuits and can be either analog or digital circuits. For example, phase compensator 13 can be implemented, using sampled data techniques, by software programming which controls the same microcomputer used to implement the reference generator and the phase detector/limiter, while buffer amplifier 14 may be an analog device having a digital-to-analog converter (DAC) combined therewith.

Figure 2:
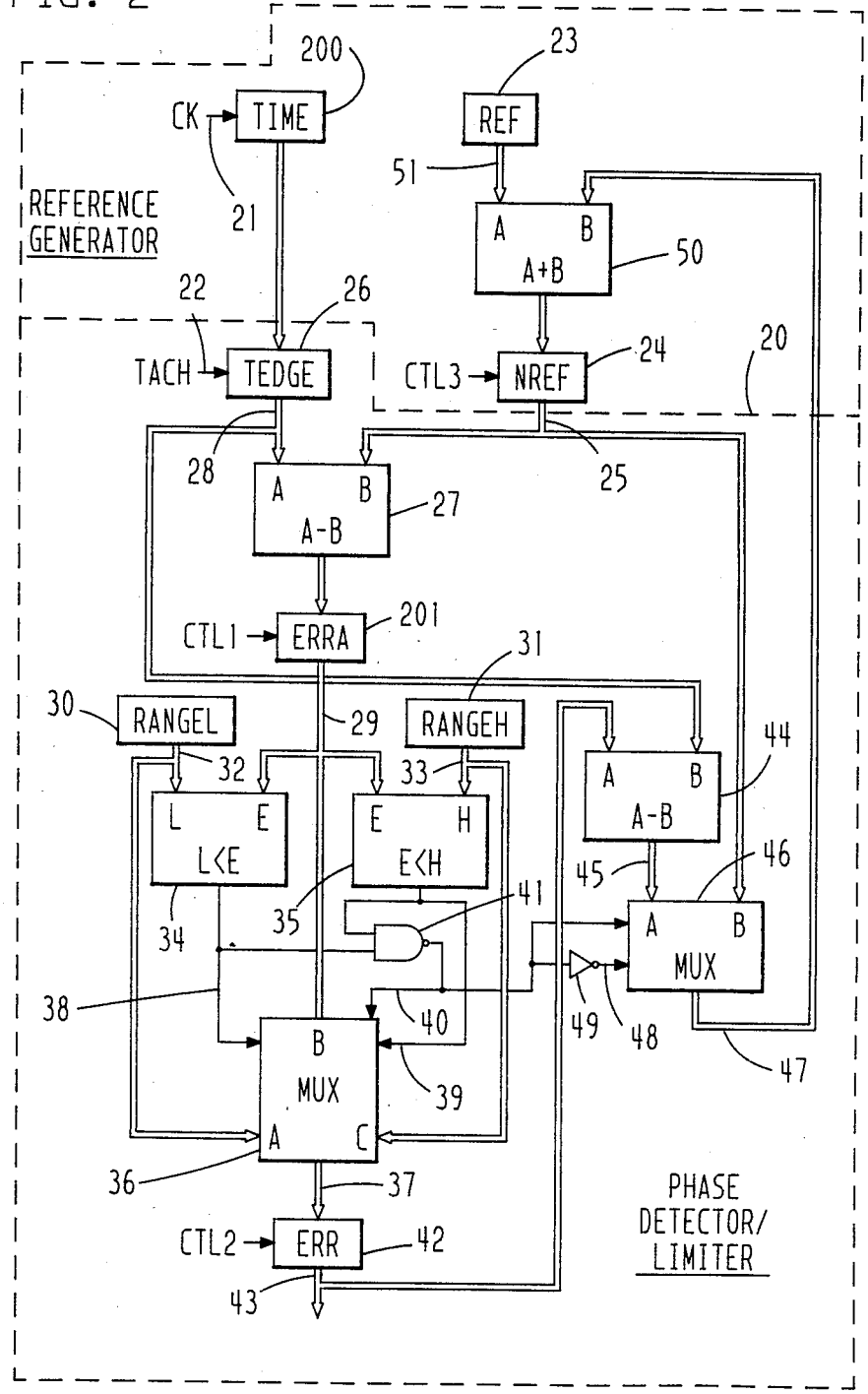
FIG. 2 is a detailed showing of the reference generator and the phase detector/limiter of FIG. 1.

The following structured program module enables one skilled in the art of programming to program a micro computer in order to achieve the device of FIG. 2. This statement is also helpful in understanding the operation of this Figure.

In this statement, the program module, entitled "PHIDET", begins upon the occurrence of each tachometer feedback pulse (TACH 22 of FIG. 2), and thereafter the three clock pulses CTL1, 2 and 3 clock the logic through the program module. The frequency of the feedback pulses is always low enough, relative the frequency of these clock pulses, such that the program module is ready to repeat when the next feedback pulse occurs.

The value of the number REF is a constant, and determines the motor's desired running speed. If the running speed is to be increased, REF is decreased to a new constant value number. The values of RANGEL and RANGEH are also constants, and are selected to determine when the system is in saturation.

```
BEGIN
PHIDET
    ERRA = TEDGE − NREF                    (CTL1)
    IF ERRA < RANGEL, THEN
        ERR = RANGEL                        (CTL2)
        NREF = TEDGE + REF − RANGEL         (CTL3)
    ELSE
        IF ERRA > RANGEH, THEN
            ERR = RANGEH                    (CTL2)
            NREF = TEDGE + REF − RANGEH     (CTL3)
        ELSE
            ERR = ERRA                      (CTL2)
            NREF = NREF + REF               (CTL3)
    END
PHIDET
```

In this module, the phase error number ERRA is a function of the time difference between the occurrence of the feedback pulse TACH of FIG. 2, as represented by the time-number TEDGE (TEDGE is a summation of the cycles of clock 21, FIG. 2), and the value of the time number NREF at which this feedback pulse was expected to occur. NREF is initialized to the value of REF. A new time-number NREF is thereafter generated upon the occurrence of each feedback pulse so that if the next feedback pulse were in phase lock, the phase error number ERRA would indicate a zero phase error upon the occurrence of said next feedback pulse. However, during acceleration of the motor, or during large speed changes of the motor, the phase error will be large.

The time-number TEDGE continues to increase, as the content of counter 200 of FIG. 2 continues to increase. The value of the time-number in counter 200 is transferred to data latch 26 of FIG. 2 upon the occurrence of a feedback pulse 22 of FIG.2.

When the system is in saturation, ERRA is either too large or too small, as compared to the low value of RANGEL or the high value of RANGEH, respectively. In this case, the reference number NREF is set to a value which varies as (1) the constant number REF, the constant number RANGEH (during acceleration of the motor, for example) and the ever-increasing number TEDGE.

So long as the system is in saturation, the value of the phase error ERR will be either RANGEL or RANGEH, a constant, and this value is effective to produce energization of the motor so long as the system remains in saturation.

When, however, the phase error ERR is detected as being within the range bounded by RANGEL and RANGEH, ERR becomes equal to ERRA, the actual phase error, and the motor is energized accordingly. In this case, NREF is reset and made to be equal to its old value plus the constant REF.

Stated in another way, the output ERR produces motor energization. When the system is in saturation, the motor's energization is determined primarily by either RANGEH or RANGEL, depending upon the polarity or sense of the saturation. When the system comes out of saturation, and so long as it remains out of saturation, the motor's energization is proportional to the phase error ERRA.

FIG. 2 is a discrete logic implementation of one aspect of the present invention, i.e. reference generator 12 and phase detector 11 of FIG. 1. The portion of FIG. 2 which is above broken line 20 implements reference generator 12, whereas the portion below this line implements phase detector 11.

Figure 3:
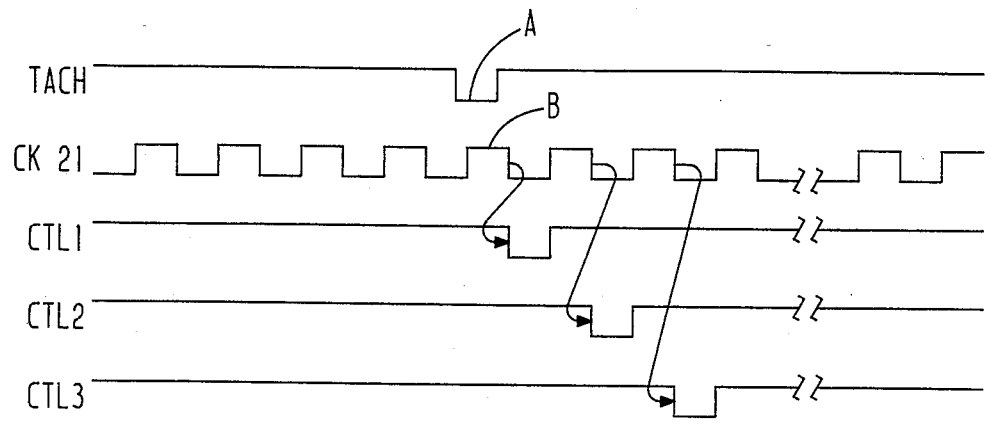
FIG. 3 is a showing of the relationship between the TACH pulse, clock 21 and the clock pulses of FIG. 1.

The timing basis of the network is a high frequency clock 21. The period of this clock is, for example, 3.2 microseconds. The occurrence of TACH pulse A, and more specifically its negative-going edge, selects clock pulse B. This clock pulse then generates clock pulses CTL1, CTL2 and CTL3. The timing diagram of FIG. 3 shows the relationship between these five signals. While the manner of clocking a control network is well known, it should be said that enough time must elapse between the clock pulses to enable the results of the arithmetic and compare operations of the discrete logic blocks to be valid, and all computation, etc. must be complete prior to the occurrence of the next feedback pulse, i.e. TACH 22. At the fastest speed of motor 10, the period of pulses 22 is about 2.5 milliseconds, for example. In 2.5 msec about "800" cycles of clock 21 will occur. In this description, a number in quotation marks will designate a decimal number.

The total accumulation of cycles of clock 21 are counted by 16-bit counter 200, i.e. the counter continues to increment so long as the servo is active. Upon overflow, counter 200 resets to zero, and begins counting again.

Assume that the servo is now activated, and starts accelerating motor 10 from rest. Counter 200 begins with a count of zero. Also assume that when the motor is up to speed, "800" cycles of clock 21 occur between adjacent motor feedback pulses TACH. In this assumed situation, counter 200 will contain a count of about "2000" when the first TACH pulse occurs, due to the fact that the motor is running slow, but is accelerating.

The input commanded speed is determined by number generator 23, designated REF. The number REF represents the number of cycles of clock 21 which will occur between TACH feedback pulses 22, when the motor is up to speed. For this example, REF is approximately "800", this being in the range of about 2.5 milliseconds worth of pulses of clock 21. When the motor is running at the desired speed, the count in counter 200 will increase by "800" between adjacent TACH pulses.

If it is desired to change the motor's speed, the number REF is changed, for example it is decreased in magnitude in order to increase the motor's speed. As a result of a motor speed increase, the period of feedback signal 22 also decreases, as the motor speed assumes the new speed commanded by the change in the magnitude of REF.

With reference to the above mentioned program module, the first event to occur is a feedback pulse 22. Data latch 24 at this time contains an initialized time-number NREF whose magnitude is chosen based upon the assumption that the motor is running at the desired speed commanded by number generator 23—in this case "800". This time-number is present on bus 25.

Upon the occurrence of the first pulse 22 of tachometer 26 (see FIG. 2), a count, for example "2000", is set into data latch 26. This latch now contains a time-number TEDGE which is a count of the number of pulses of clock 21 which have occurred since the motor began accelerating. The amount by which this number has increased since the previous TACH pulse is a measure of the motor's actual speed. In this assumed condition, where the motor is accelerating from rest, TEDGE is much greater than NREF. Specifically, TEDGE ="2000" and NREF ="800". The number TEDGE appears on bus 28.

The phase error ERRA can now be computed. This computation is performed by subtract circuit 27, a 16-bit ALU. Circuit 27 computes a time-number TEDGE -NREF, i.e. "2000"—"800"="1200". This number represents the phase error ERRA, and appears on bus 29 upon the occurrence of clock pulse CTL1.

The network is now ready to compare the phase error number ERRA, in this case "1200", to both a high and a low preset number, RANGEH and RANGEL, respectively, which define a number range outside of which the phase error is such that a special mode of operation is implemented, in accordance with the present invention, to prevent the motor from being energized in a manner to overshoot and ring about the desired steady state speed, which speed is commanded by REF number 23. The high number, RANGEH, tests for the magnitude of TEDGE being high relative to NREF. This is an indication that the time period between TACH pulses 22 is excessively long, i.e. the motor is running very slow. In the present case of motor acceleration, ERRA will be greater than RANGEH.

It will further be assumed that RANGEH and RANGEL are of the absolute decimal magnitudes "XXX+400" and "XXX−400", respectively. This means that it has been predetermined (1) that the magnitude of TEDGE - NREF="XXX" represents zero phase error, and (2) the system will be considered, by definition, to be in saturation when the result of this subtraction is "400" higher or lower than the zero-phase-error number "XXX".

When the motor's phase is lagging, comparator 35 operates, and RANGEH, of an exemplary magnitude "XXX+400", is effective. When the motor's phase is leading, comparator 34 operates, and RANGEL, of an exemplary magnitude "XXX−400" is effective.

Figure 4:
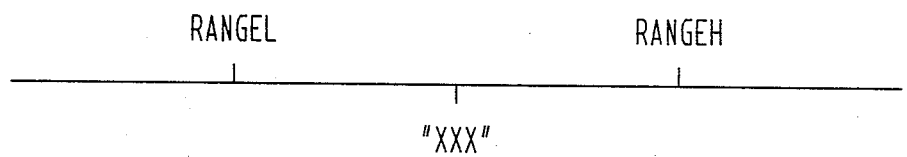
FIG. 4 is a graphical showing of the relationship between a number "XXX", which represents zero phase error, and the two numbers RANGEL and RANGEH, which define the two states of servo saturation.

FIG. 4 shows the relationship between the phase error ERRA which can exist and the time-numbers RANGEH and RANGEL. While in this figure the two preselected values are spaced generally equidistant from a zero phase error number "XXX", such need not be the case, since these two values can be independently selected.

The two time-numbers RANGEL and RANGEH are preset into latches 30 and 31, respectively, and they appear on buses 32 and 33, respectively. Comparator 34, a two's complement comparator, is provided to compare the phase error number ERRA to the lower limit range number RANGEL, whereas comparator 35, also a two's complement comparator, compares the phase error number to the upper limit range number RANGEH.

Multiplexor 36 operates to gate one of the three time-numbers ERRA, RANGEL or RANGEH to bus 37. Multiplexor 36 is controlled to perform this function by one of three input conductors 38, 39 or 40, only one of which can be active at any given time. For example, assume that the time-number ERRA is less than time-number RANGEL. In this case only conductor 38 will be active, since by definition ERRA must now be also less than RANGEH, and output conductor 39 of comparator 35 is not active. When the system is not in saturation, i.e. ERRA lies between RANGEL and RANGEH, both of conductors 38 and 39 will be inactive. In this case the operation of inverting AND gate 41 provides an active signal on conductor 40.

When conductor 40 is active, the output of multiplexor 36 becomes time-number ERRA. At clock interval CTL2 the number on bus 37 is placed in data latch 42 and appears on bus 43. This number is applied to phase compensator 13 of FIG. 2 and operates to control motor energization.

With reference now to subtract circuit 44, a 16-bit ALU, this circuit receives as input the two time-numbers TEDGE and ERR. The difference between these two numbers, i.e. TEDGE - ERR, appears on bus 45. Recall that ERR will be one of the three possible time-numbers ERRA, RANGEL or RANGEH. Since this is true, the corresponding three possible outputs of subtract circuit 44, a 16-bit ALU, are (1) TEDGE ERRA, (2) TEDGE - RANGEL, and (3) TEDGE - RANGEH.

The time-number output of circuit 44 appears on bus 45, and is applied to the A input of multiplexor 46. The time-number NREF is applied to the B input of multiplexor 46. This multiplexor operates to apply one of these two inputs A or B to bus 47, under the control of whichever of the two conductors 40 or 48 are active. As mentioned above, conductor 40 is active whenever the phase error time-number ERRA lies within the limits defined by the time-numbers RANGEL and RANGEH, that is whenever the system is not in saturation, as this term is defined by the magnitude of RANGEL and RANGEH. Invertor 49 operates to produce an active conductor 48 whenever conductor 40 is not active. i.e. whenever the system is in saturation.

The operation of multiplexor 46 is such that when conductor 40 is active, multiplexor input B is applied to bus 47, and whenever conductor 48 is active, input A is applied to bus 47. Conductor 48 is active when the system is in saturation, and conductor 40 is active when the system is not in saturation.

In the present assumed condition of acceleration, the system is in saturation. In this case, the time-number on bus 47 is TEDGE - RANGEH. Adder circuit 50, a 16-bit ALU, operates to add the signal on bus 47 to the time number REF, i.e. the constant number "800", which is on bus 51. At clock time CTL3, the new time-number NREF=REF+TEDGE RANGEH is set into data latch 24. Note that this number is made up of two constant values REF and RANGEH. The value TEDGE continues to increase in magnitude as the motor speeds up, however the rate of increase in the value of TEDGE decreases as the motor speeds up, and at running speed the value of TEDGE increases by the value of REF ("800") upon the occurrence of each TACH pulse 22.

This new time-number is now used when the next TACH pulse 22 occurs, and the above described operation repeats, i.e. the operation of the above described program module repeats.

This new time-number, REF+TEDGE−RANGEH, is a number that assumes that the motor is running at the desired speed, but is lagging the previous time-number NREF by RANGEH counts of clock 21.

Stated somewhat differently, this new time-number NREF (equal to TEDGE+REF−RANGEH) is a number that assumes that the motor is running at the desired speed, that the next value of TEDGE will be equal to the current value of TEDGE plus the constant value REF, and that the next value of ERRA will be equal to RANGEH, thus keeping the phase detector at its saturation limit until the motor is up to speed. For example, under the assumed condition of acceleration, the previous value of TEDGE was "2000". When the motor is running at the desired speed, counter 200 will advance "800" by the time the next TACH pulse occurs. In this case, the next value of TEDGE would equal "2800", i.e. the value of the previous TEDGE, plus REF. In this assumed case, however, the next value of TEDGE is greater than "2800", because the motor is still accelerating, and is running slow. Therefore, once again the time-number NREF is made equal to this next generated TEDGE, plus the constant value of REF, minus the constant value of RANGEH.

By way of a general description, consider three consecutive TACH pulses, identified as pulses N−1, N and N+1, respectively. As the system awaits the arrival to TACH pulse N, the value of NREF waiting in data latch 24 is a function of the value of TEDGE which occurred at TACH pulse N−1, i.e. the value of TEDGE which was placed in data latch 26 by the occurrence of TACH pulse N−1.

TACH pulse N now occurs. The TEDGE value now placed in data latch 26 is equal to the previous value of TEDGE +"XXXX", where "XXXX" is the number of pulses of clock 21 which have occurred between TACH pulses N−1 and N.

A new value of NREF, is now placed in data latch 24. When the motor's phase is lagging, and the system is saturated, this new value of NREF equals that value of TEDGE +REF−RANGEH. When the motor's phase is leading, and the system is saturated, this new value of NREF equals that value of TEDGE+REF−RANGEL. When the system is not in saturation, this new value of NREF equals the previous value of NREF+-REF.

In this way, the motor's energization is maintained at a level, as determined by the constant values of REF and RANGEH and the new value TEDGE, (i.e. a new value for each TACH pulse 22.), so long as the system remains in saturation. As the motor's speed approaches the desired speed, the value of TEDGE approaches the value of NREF, and the motor's energization accordingly is reduced, to prevent overshoot of the motor's speed.

According to the present invention, the saturation-mode feedback is implemented in such a way that the system assumes that the motor is running at the desired speed, but that the phase error is just at one of the saturation boundaries defined by RANGEL and RANGEH. In this way, the motor is quickly brought to its running speed, as determined by the clock signal REF, without speed overshoot.

In a similar manner, the system operates to reduce the motor's energization, for example assume that the magnitude of the number REF is doubled, as a command to reduce the motor's speed by one half. In this case, the system would likely also go into saturation, but in this case the value of RANGEL would be used to control motor energization as the motor decelerated.

While the invention has been particularly shown and described with reference to preferred embodiments thereof, it will be understood by those skilled in the art that various changes in form and details may be made therein without departing from the spirit of and scope of the invention.

We claim as our invention:

1. A phase lock loop, comprising:
a high frequency clock (21),
a counter (200) driven by said clock,
a low frequency source (22) of a repeating input pulse (TACH),
a first data latch (26) controlled by said input pulse and operative to receive the numerical content of said counter upon the occurrence of each of said input pulses,
a reference number (REF) whose magnitude is indicative of the number of high frequency clock pulses which should occur between each pulse of said low frequency source,
a second data latch (24) initially containing said reference number,
digital phase detector means (27) receiving as input the content of said first and second data latches, and providing an output signal (ERRA) indicative of the numeric difference which exists between these two inputs,
range defining means operable to generate a high magnitude number (RANGEH) defining an upper limit of numeric difference, and a low magnitude number (RANGEL) defining a lower limit of numeric difference,
testing means (34, 36 and 35) receiving said high and low limit numbers and the numeric difference output of said phase detector means, said testing means generating an output number which is directly related to said numeric difference when said difference lies between the upper and lower limits which are defined by said high and low magnitude numbers, respectively, and generating an output number which is directly related to the upper and lower limits, respectively, when said numeric difference is above or below the limits defined by said high and low magnitude numbers, respectively, and
reset means (46 and 50) responsive to said testing means determining that said numeric difference is above or below the limits defined by said high and low magnitude numbers, and operable in response thereto to reset the number content of said second data latch in a manner intended to bring said numeric difference within the range defined by said upper and lower limits upon the occurrence of a subsequent input pulse.

2. The phase lock loop of claim 1 wherein said testing means includes:
a first comparator (35) receiving said high limit number and said numeric difference number as inputs thereto, and providing an output when said difference number is higher than said high limit number,
a second comparator (34) receiving said low limit number and said numeric difference number as inputs thereto, and providing an output when said difference number is lower than said low limit number,
gate means (41) receiving the outputs of said first and second comparators as inputs thereto, and providing an output when said difference number is neither higher than said high limit nor lower than said low limit, and
first multiplexor means (36) receiving as inputs said numeric difference number, said high limit number, said low limit number, the outputs of said first and second comparators, and the output of said gate means, the presence of an output from either of said comparators operating to cause said multiplexor means to provide said high limit or said low limit numbers as an output (ERR) therefrom, and the presence of an output from said gate means causing said multiplexor means to provide said difference number as an output (ERR) therefrom.

3. The phase lock loop of claim 2 wherein said reset means includes:
a subtraction circuit receiving as inputs the content of said first data latch and the output of said first multiplexor means, and providing as an output (45) therefrom a number which is the numeric difference between the content of said first data latch and the output of said first multiplexor means,
second multiplexor means (46) receiving as inputs the output of said subtraction circuit, the content of said second data latch, and the output of said gate means, and providing as an output the output of said subtraction circuit when said numeric difference number is either lower than said low limit number or higher than said high limit number, and providing as an output the content of said second data latch when said numeric difference number is neither lower than said low limit number nor higher than said high limit number,
an adder circuit (50) receiving as inputs the output of said second multiplexor means and said reference number, and providing an output which is the sum of these two inputs thereto, and
means connecting the output of said adder circuit to said second data latch.

4. The phase lock loop of claim 3 including:
a third data latch (201) connected to the output of said subtractor circuit to contain said numeric difference,
a fourth data latch (42) connected to the output of said first multiplexor to contain the output thereof, and
a fifth data latch (24) connected to the output of said adder circuit to contain the output thereof.

5. The phase lock loop of claim 4 including:
a first (CTL1), second (CTL2) and third (CTL3) clock signal by said high frequency clock within a period less than the period of said low frequency source, and
means connecting said first clock pulse to said third data latch to initiate operation thereof, thereafter connecting said second clock pulse to said fourth data latch to initiate operation thereof, and lastly connecting said third clock pulse to said fifth data latch to initiate operation thereof, all in the stated sequence.

6. The phase lock loop of claim 5 including:
an electric motor whose speed is to be controlled as a function of said reference number, as the magnitude of said reference number relates to cycles per unit of time of said high frequency clock, and means connecting the output of said first multiplexor means to said motor to control energization thereof.

7. A digital phase lock loop, comprising:

a source (26) of an input first number (TEDGE) whose magnitude represents the passage of time, a resettable source (24) of a reference second number (NREF), phase detector means (27) receiving said first and second numbers as an input, and providing an output number (ERRA) indicative of the difference which exists between the two input numbers, range defining means operable to generate a third number (RANGEH) defining an upper limit of said difference, and a fourth number (RANGEL) defining a lower limit of said difference, testing means (34, 35 and 36) receiving said second, third and fourth numbers as inputs, and generating an output number (ERR), said testing means generating a fifth number which is directly related to said difference when said difference lies between the upper and lower limits which are defined by said third and fourth numbers, respectively, and generating a sixth number which is directly related to the third and fourth numbers, respectively, when said difference is above or below the limits defined by said third and fourth numbers, respectively, and reset means (46 and 50) responsive to said testing means generating said sixth number, and operable in response thereto to reset said second number in a manner intended to bring said difference with the range defined by said third and fourth numbers upon the occurrence of a subsequent first number.

8. The phase lock loop of claim 7 including:

a first latch (26) containing said first number, a reoccurring event (TACH) operable to provide a said first number to said first latch upon the occurrence of each of said events, such that said first number steps in large numeric increments which are related to the time period between said events, and a second latch (24) containing said second number, said second number being reset by said reset means to a value which is a function of said sixth number, and defines an expected time to the next one of said events.

9. The phase lock loop of claim 8 wherein said reset means is responsive to said testing means generating said fifth number to thereby reset said second number to a value which is a function of said difference.

10. The phase lock loop of claim 9 including:

motive means energized in accordance with the output number of said testing means, and feedback means driven by said motive means and operable to generate said reoccurring event.

11. A phase lock loop motor speed servo, comprising:

a variable speed motor, a tachometer driven by said motor and constituting a repeating pulse (TACH), the period of which is indicative of motor speed, a constant frequency clock (21 and 200), a latch (26) controlled by said tachometer, and operable upon the occurrence of a tachometer pulse to latch the total number of clock cycles, a number source (23) defining the first reference number (REF), said first reference number defining the number of cycles of said clock which will occur when said motor is running at a predetermined speed, an adder circuit (50) receiving as one of two inputs said reference number, and generating a second reference number (NREF) therefrom, phase detector means (27) receiving as inputs the content of said latch and said second reference number, and providing an output (ERRA) indicative of the difference which exists between the two inputs, range defining means operable to define an upper limit (RANGEH) and a lower limit (RANGEL) of difference, testing means (34, 35 and 36) receiving as input said limits and the output of said phase detector means, said testing means generating a motor energization output signal which is directly related to said difference when said phase difference lies within said upper and lower limits, and generating a motor energization output signal which is directly related to said upper and lower limits when said difference is outside of said limits, reset means (46) responsive to said testing means determining that said difference is outside of said limits, and operable in response thereto to provide a second input to said adder means, to thereby control said second reference number as a function of said upper and lower limits upon the occurrence of subsequent tachometer pulse, and means connecting said motor energization output signal to said motor.

12. The servo of claim 11 wherein said reset means is responsive to said testing means determining that said difference is within said limits, and operable in response thereto to provide a second input to said adder means, to thereby control said second reference number as a function of said first reference number upon the occurrence of said subsequent tachometer pulse.

13. The servo of claim 12 wherein said reset means is responsive to said testing means determining that said difference is outside of said limits, and operable to provide a second input to said adder means, to control said second reference number as a function of said upper and lower limits.

* * * * *